US 8,244,913 B1

(12) United States Patent
Sumner et al.

(10) Patent No.: US 8,244,913 B1
(45) Date of Patent: Aug. 14, 2012

(54) REPLICATION HORIZON DETERMINATION WITH AN INDEPENDENT DISTRIBUTED DATABASE SYSTEM

(75) Inventors: Jeffery A. J. Sumner, Oakville (CA); Morgan W. Jones, Mississauga (CA); Peter G. Stachowski, Mississauga (CA)

(73) Assignee: Progress Software Corporation, Bedford, MA (US)

( * ) Notice: Subject to any disclaimer, the term of this patent is extended or adjusted under 35 U.S.C. 154(b) by 996 days.

(21) Appl. No.: 11/084,372

(22) Filed: Mar. 18, 2005

Related U.S. Application Data

(60) Provisional application No. 60/618,736, filed on Oct. 13, 2004.

(51) Int. Cl.
*G06F 15/16* (2006.01)
*G06F 7/00* (2006.01)
(52) U.S. Cl. ......... 709/248; 709/223; 707/611; 707/631
(58) Field of Classification Search .................. 709/221, 709/201, 215, 217, 223, 246, 248; 340/512, 340/2.4; 370/235, 242, 248; 707/1, 10, 201, 707/104.1, 200, 203, 611, 626, 631
See application file for complete search history.

(56) References Cited

U.S. PATENT DOCUMENTS

| | | | | |
|---|---|---|---|---|
| 5,553,279 A * | 9/1996 | Goldring | ...................... | 707/615 |
| 5,710,885 A * | 1/1998 | Bondi | ........................... | 709/224 |
| 5,870,761 A * | 2/1999 | Demers et al. | ........................ | 1/1 |
| 5,892,923 A * | 4/1999 | Yasuda et al. | ................ | 709/239 |
| 5,924,094 A * | 7/1999 | Sutter | .................... | 1/1 |
| 6,047,309 A * | 4/2000 | Dan et al. | ...................... | 709/201 |
| 6,055,568 A * | 4/2000 | Adams | .......................... | 709/221 |
| 6,237,034 B1 * | 5/2001 | Fulford | ......................... | 709/224 |
| 6,301,589 B1 * | 10/2001 | Hirashima et al. | .................... | 1/1 |
| 6,446,092 B1 | 9/2002 | Sutter | | |
| 6,542,468 B1 * | 4/2003 | Hatakeyama | ................. | 370/238 |
| 6,636,851 B1 * | 10/2003 | Bamford et al. | ..................... | 1/1 |
| 6,907,472 B2 * | 6/2005 | Mushkin et al. | .............. | 709/248 |
| 6,910,052 B2 * | 6/2005 | Gates et al. | ........................... | 1/1 |
| 7,302,489 B2 * | 11/2007 | Kraft | ............................. | 709/230 |
| 7,500,020 B1 * | 3/2009 | Kabra et al. | .................. | 709/248 |
| 7,542,485 B2 * | 6/2009 | Bingham et al. | .............. | 370/507 |
| 2003/0097478 A1 * | 5/2003 | King | ............................ | 709/248 |
| 2003/0101258 A1 * | 5/2003 | Parham | ........................ | 709/224 |
| 2005/0076094 A1 * | 4/2005 | Sasaki et al. | .................. | 709/217 |
| 2005/0198032 A1 * | 9/2005 | Cochran | ........................ | 707/10 |
| 2006/0004877 A1 * | 1/2006 | Ishikawa et al. | ............. | 707/200 |

\* cited by examiner

*Primary Examiner* — John Follansbee
*Assistant Examiner* — Madhu Woolcock
(74) *Attorney, Agent, or Firm* — Patent Law Works LLP

(57) ABSTRACT

In a preferred embodiment of the present invention, the replication horizon and other data propagation-related information is tracked through the use of a "pulse" and "echo" approach.

21 Claims, 11 Drawing Sheets

| Pulse Site | Pulse ID | Echo Site | Returning Echo Time |
|---|---|---|---|
| First Site ID | Eighth Pulse for First Site | First Echo Site ID | Returning Echo Time for this Site Pair |
| First Site ID | Eighth Pulse for First Site | Second Echo Site ID | Returning Echo Time for this Site Pair |
| ... | ... | ... | ... |
| Second Site ID | Second Pulse for Second Site | First Echo Site ID | Returning Echo Time for this Site Pair |
| Second Site ID | Second Pulse for Second Site | Second Echo Site ID | Returning Echo Time for this Site Pair |
| ... | ... | ... | ... |

Echo Table (One entry per <origsite, siteID> Site Pair, replicated to sites)

Example Independent Distributed Database

Overview of Method (Done by All Sites)

Sending a Pulse (Done by Each Replicating Site)

Sending an Echo (For Each Site that Receives Replicated Data)

| Originating Site | Pulse ID | Pulse Time |
|---|---|---|
| First Site ID | Unique Pulse ID | Pulse Time for First Site ID |
| ... | ... | ... |

402 — Originating Site
404 — Pulse ID
406 — Pulse Time
400

Fig. 4
Pulse Table (One entry per pulse-generating site, replicated to sites)

| Pulse Site | Pulse ID | Echo Site | Returning Echo Time |
|---|---|---|---|
| First Site ID | Eighth Pulse for First Site | First Echo Site ID | Returning Echo Time for this Site Pair |
| First Site ID | Eighth Pulse for First Site | Second Echo Site ID | Returning Echo Time for this Site Pair |
| ... | ... | ... | ... |
| Second Site ID | Second Pulse for Second Site | First Echo Site ID | Returning Echo Time for this Site Pair |
| Second Site ID | Second Pulse for Second Site | Second Echo Site ID | Returning Echo Time for this Site Pair |
| ... | ... | ... | ... |

Fig. 5

Echo Table (One entry per <origsite, siteID> Site Pair, replicated to sites)

Determining a Horizon for a Site

Possible User interface Showing Horizon for 'Network First Site'

Example of How to Use Horizon

Example of Establishing False Horizon in Peer to Peer Network

US 8,244,913 B1

REPLICATION HORIZON DETERMINATION WITH AN INDEPENDENT DISTRIBUTED DATABASE SYSTEM

CROSS-REFERENCES TO RELATED APPLICATIONS

The present application claims priority from U.S. Provisional Patent Application Ser. No. 60/618,736, entitled "Replication Horizon Determination with an Independent Distributed Database System" filed on Oct. 13, 2004, which is incorporated herein by reference.

This application is also related to U.S. Pat. No. 6,446,092 to Sutter, filed Mar. 15, 1999, which is a continuation-in-part of patent application Ser. No. 08/742,024, which was filed Nov. 1, 1996, now U.S. Pat. No. 5,924,094 to Sutter, both of which are incorporated herein by reference.

BACKGROUND OF THE INVENTION

1. Field of the Invention

A preferred embodiment of the present invention relates to distributed databases. In particular, a preferred embodiment of the present invention relates to a system and method for determination of replication horizons and other related data propagation methods within such as system.

2. Description of the Background Art

Distributed computing networks are becoming more and more popular. With increased business use of the Internet, the need for more efficient, distributed computing system has become critical. The business use of the Internet has forced the integration of disparate computing environments with distributed computing systems that enable data transfer between such disparate systems. However, this in turn has created a need for ways to ensure that the data stored on various distributed systems are coherent and do not contain inconsistent information.

Conventional independent distributed database (IDDB) systems provide for multiple, simultaneous, potentially geographically dispersed, replicated copies of a database. This architecture allows continuous, high quality-of-service, local data access to multiple users regardless of their respective locations and regardless of the quality or availability of network connectivity between the database sites. The IDDB also provides for update-anywhere capabilities. That is, all sites running the system can perform local, autonomous database updates and the IDDB guarantees that these updates flow to all sites within the IDDB network. Each site's updates are treated equally and a site's update is only overridden in the case of a direct data conflict when, for the most part, the latest chronological change will survive. The replication process occurs asynchronously to, and is not triggered by, the data updates.

Common questions asked by users of an IDDB database are "How do I know when my changes are visible to a specific site?" and "How do I know when my changes are visible to the whole network?" While an IDDB system provides many benefits in terms of data availability and quality of service, it does not insure that all sites within an IDDB network simultaneously, and in real-time, contain exact replicas of one another's data. Rather, the IDDB system guarantees that, over time, data changes created at any site within the IDDB network will propagate to all other sites in the IDDB network. For many mission critical, data-centric applications, the benefit of continuous, high performance, local data access far outweighs the need for the instantaneous data replication that can only be provided by a centralized database model. That being said, it is often of interest to be able to determine the point in time where a particular data change, at a particular IDDB site, is known to have successfully propagated to all other sites in the IDDB network.

SUMMARY

Preferred embodiments of the present invention allow for the determination of a "replication horizon" for each site in an Independent Distributed Database (IDDB) network. A replication horizon for a specific site, or "site horizon," is calculated to be a specific point in time and chronologically advances with time. (In the described embodiments, this time is relative to the site from which it was created, and requires synchronized clocks to be completely meaningful at other sites.) Each site's site horizon defines a time before which all data changes made at that site are known to have been successfully propagated to all sites in the IDDB network. For data changes made at a site after the current site horizon, the extent to which these changes have propagated to other sites in the IDDB network can also be determined on a per-site basis by preferred embodiments of the present invention. A "network horizon" is calculated to be a specific point in time before which all data changes made at all sites are known to have been successfully propagated to all other sites in the IDDB network. It also chronologically advances with time.

In a preferred embodiment of the present invention, the site horizon and other data propagation-related information (network horizon, cleanup data, etc.) is tracked through the use of a "pulse" and "echo" approach. During periodic replication sessions where a given IDDB site has completely replicated all local data changes to another site, a timestamped, originating-host-specific "pulse" record is placed into a pulse table in the local database and this pulse record is replicated to the other site along with all other local data changes. It is important to note that the pulse record is only written and replicated to the other site in the event all other data changes were replicated successfully. Subsequent to the initial propagation of the pulse record to a second site, the pulse record will begin to further propagate through the IDDB network as further replications occur between various pairs of sites in the IDDB network. Ultimately, the pulse record will propagate to all sites in the IDDB network.

Periodically, (for example, at the end of every replication cycle) each site in the IDDB network will interrogate the contents of its local pulse table and look for newly arrived pulse records. The timestamp of each newly arrived pulse record indicates that all data changes existing on the pulse-originating site on or before the timestamp have been successfully received by the local site. For each newly arrived pulse record, each recipient site will place a corresponding timestamped, recipient-host-specific "echo" record into an echo table in the local database. These echo records will ultimately propagate back to the originating pulse site in the IDDB network.

On any site in the IDDB network where a pulse record and one or more corresponding echo records exist, horizon information and other related data propagation metrics relating to the pulse-originating site can be determined. For example, all data changes from the pulse-originating site, which are earlier than the pulse timestamp, are known to have been successfully propagated to any site for which a corresponding echo record exists. Further, if a corresponding echo records exists for all sites in the IDDB network, it can be assumed that the oldest echo timestamp represents the site horizon for the pulse-originating site. In a preferred embodiment, only one pulse record will ever exist from each pulse-generating site at any other site, as a newer pulse will automatically overwrite an older one, since pulses are replicated in the same manner as the user data. Other embodiments could have pulses generated after each replication cycle, allowing for multiple pulses at any given site.

A preferred embodiment of the present invention extends the applicability of the IDDB to applications requiring, or which would benefit from, knowledge of the data propagation characteristics of a distributed database environment.

BRIEF DESCRIPTION OF THE DRAWINGS

The invention is illustrated by way of example, and not by way of limitation in the figures of the accompanying drawings in which like reference numerals refer to similar elements.

FIG. 4 is an example of a pulse table in accordance with a preferred embodiment of the present invention.

FIG. 5 is an example of an echo table in accordance with a preferred embodiment of the present invention.

DETAILED DESCRIPTION OF PREFERRED EMBODIMENTS

Figure 1A:
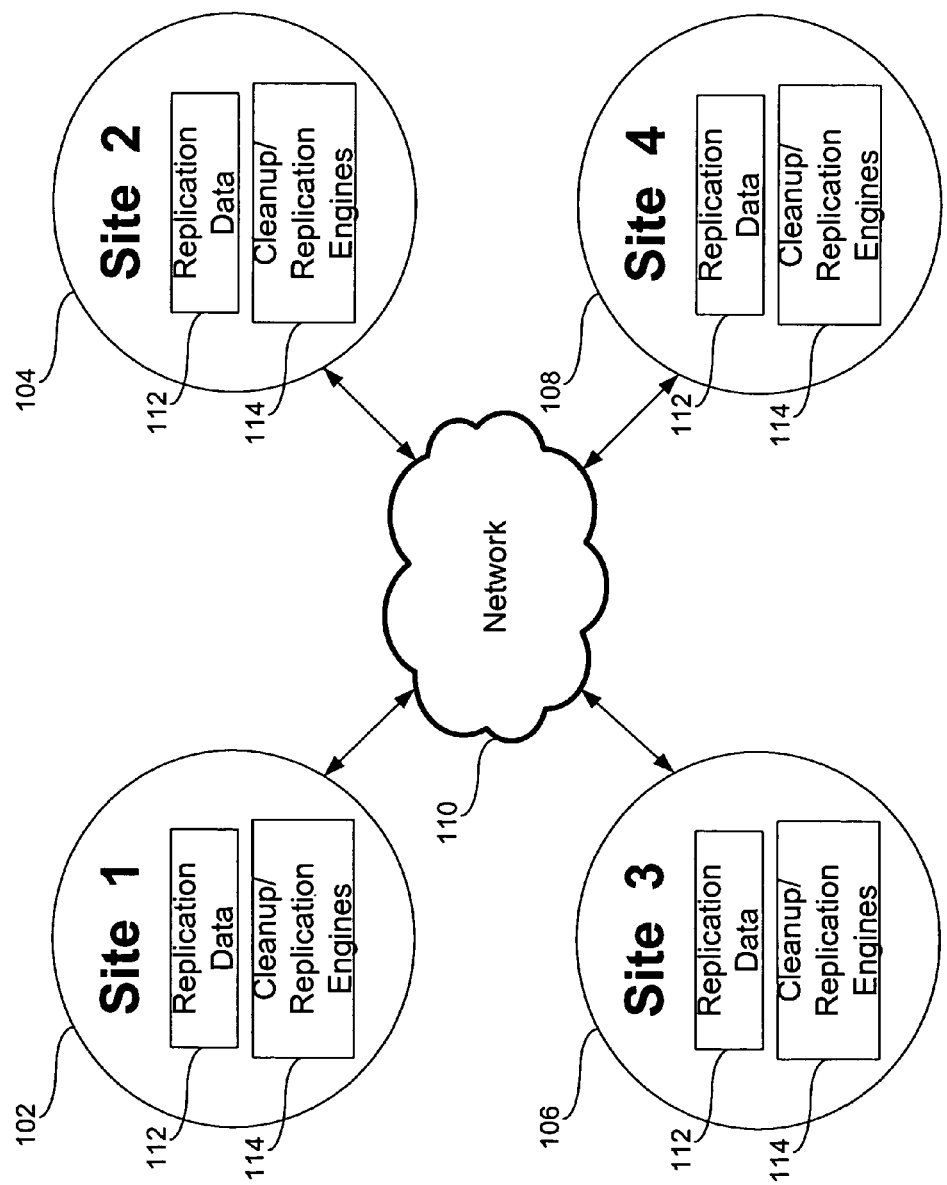
FIG. 1(a) is a block diagram of a network in which the present invention can be used.

FIG. 1(a) is a block diagram of a network in which the present invention can be used. FIG. 1(a) shows a network having four sites 102, 104, 106, and 108 that communicate with each other over a network 110. Each site contains all or part of a database and has replication data 112 and cleanup/replication engines 114, both of which are discussed below and which can be implemented as hardware or software.

A site can contain either a single-user database or shared database paired with the replication engine 114. The replication engine 114 can reside on the same computer as the database or a separate computer. On each site, a copy of the database is available. In the background, the replication engine 114 manages changes to the database by replicating data updates with other active sites on the network.

Figure 1B:
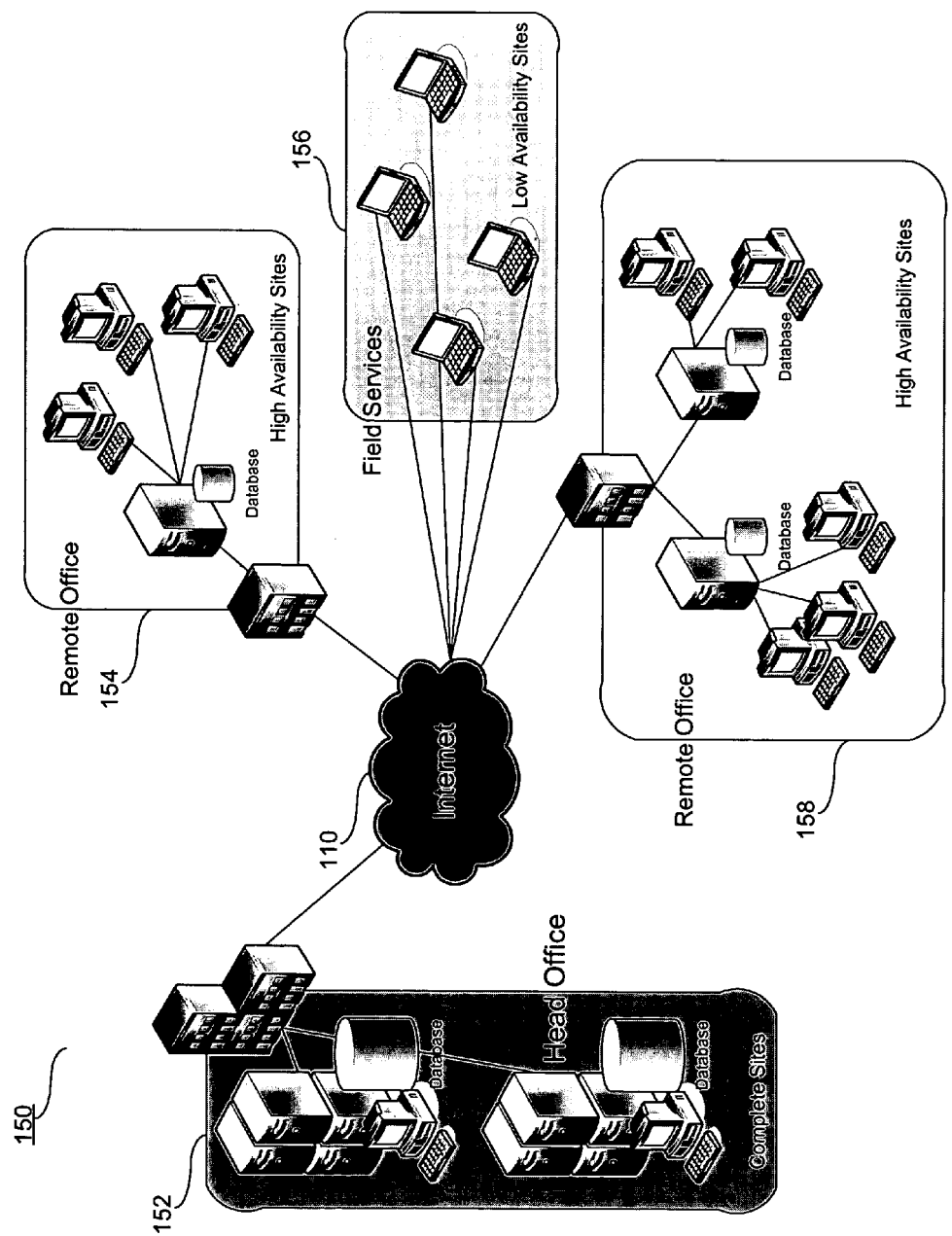
FIG. 1(b) is a diagram showing a specific example of a network in which the present invention can be used.

FIG. 1(b) is a diagram showing a specific example of a system 150 in which the present invention can be used. FIG. 1(b) shows a system 150 that is a configuration of complete, high availability, and low availability sites. A complete site has a database that contains all of the data in the network and automatically receives any new modifications that are created. Complete sites are typically considered to be available at all times. High availability sites are generally connected to a network, while low availability sites are so named because they tend to be frequently disconnected. Both high availability and low availability sites may have partitioned databases (i.e., may contain only a subset of the entire replicated database). FIG. 1(b) shows a replication network that has two complete sites (Head Office) 152 connected over a high speed network 110, such as the Internet, to several high availability (Remote Office) sites 154, 158 and low availability (Field Services) sites 156.

FIG. 1(b) shows an example of a replication network. The replication network is a configuration of complete, high availability and low availability sites. Typically, a replication network has a complete server located at a central data center and several high or low availability servers set up in remote offices or at field sites. An application runs locally using data stored in local databases and therefore is always available. In the background, the replication engine 114 manages changes to an application by synchronizing and replicating data updates with other applications that are designated as active sites in the network.

The described embodiments of the present invention can be used with at least two types of replication networks:
Homogeneous Data replicated between databases of the same type. For example an all Microsoft SQL Server database network.
Heterogeneous Data replicated between different types of databases. For example, replication between a Microsoft SQL Server database and an Oracle database.

A replication network has the following components that enable a user to design and administer a replication engine 114. The application engine 114 detects changes made to a database since the last replication session, propagates these changes to other active sites on the network, and performs all replication tasks including database updates, insertions, deletions, and conflict resolution.

In a preferred embodiment, the replication engine 114 is the core component of a replication network system 150. It performs point-to-point session-based replication over a TCP/IP connection between activated databases. There are no change logs or queues. The replication engine reads the latest data directly from the database and determines what data has been changed, through the use of control tables. The control tables do not duplicate any data fields from a replicated table, except a primary key. The control tables include information such as time and site of the last update to each defined data portion, or fragment, of the record. When a record is updated, the control table information in the corresponding control table is also updated. The control table information enables the replication engine to identify table rows that have changed since the previous replication session. This enables the replication engine to dynamically select only those changes relevant to a partner site during any time period—usually being all changes since the last replication. In a preferred embodiment, replication requires a set of special system tables and control tables.

In a two-tier implementation, each computer within the network has a single database and the replication engine 114 installed. One computer is activated as the First (complete) Site while additional computers are activated as low availability sites. The First Site contains all of the data that comprises a replication network, while the low availability sites only contain that data that is of interest to its users. This scenario mimics a typical network deployment in which sites exist in the same local area network, but are frequently disconnected. It is referred to as having a hub-and-spoke topology.

In a multi-tier topology, there is a combination of complete or high availability sites and low availability sites. The high availability or complete sites can initiate replication sessions with each other, and low availability sites can initiate replication sessions with any high availability or complete site. This topology is suitable for providing replication support for a typical WAN, in which the complete or high availability sites exist on separate LANs.

Figure 2:
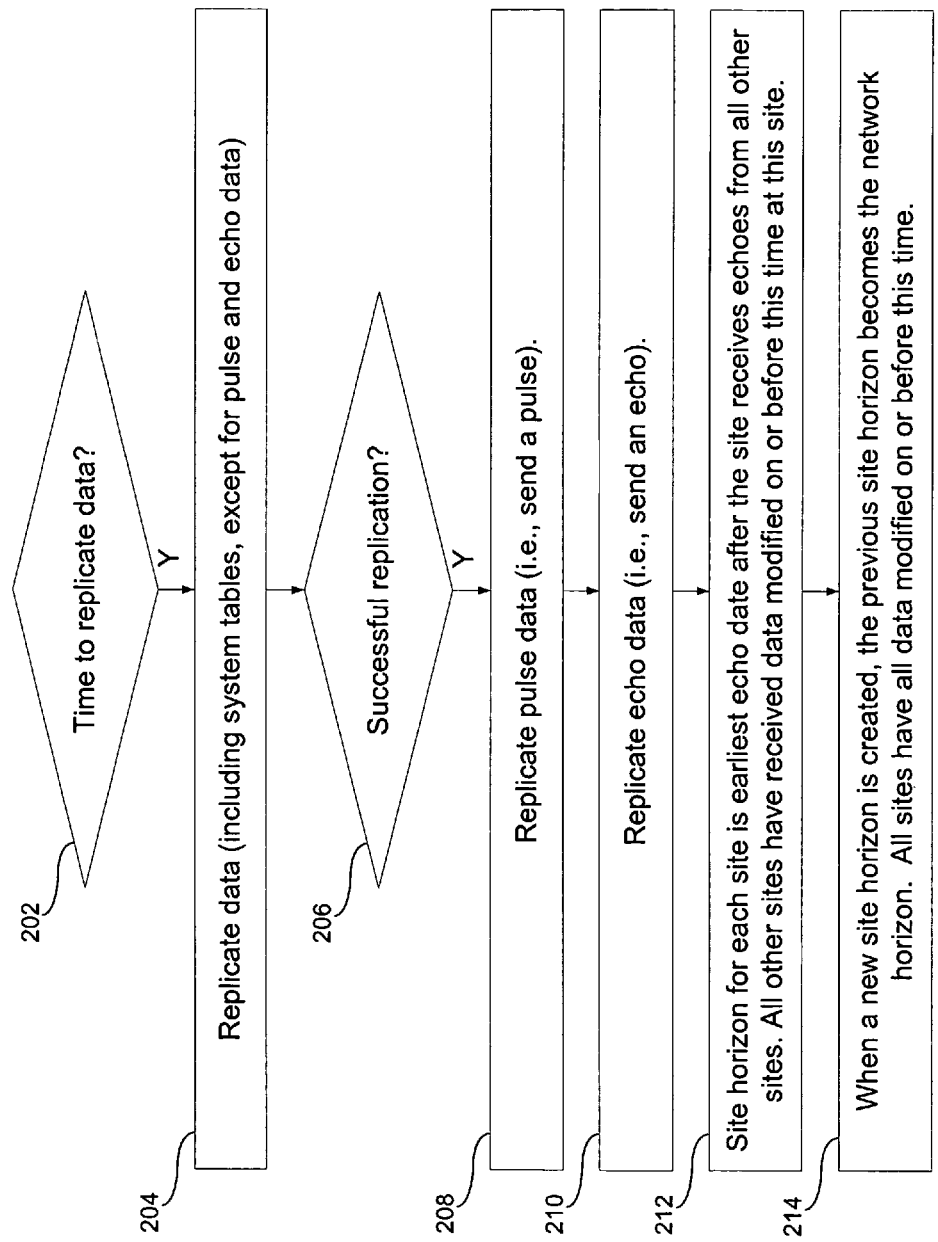
FIG. 2 is a flow chart of a method for finding and using replication horizons in accordance with described embodiments of the present invention.

FIG. 2 is a flow chart of a method for finding and using a site horizon in accordance with described embodiments of the present invention. To determine a site horizon for its data tables, a site needs to generate a pulse that is echoed by other sites in the replication network. Once an echo returns to the originating site, that site can be certain that the echoing site has received all updates that existed locally prior to the echo time. If the site looks at all the echoes from all sites that correspond to its pulse, then the earliest-dated echo gives the site's horizon (i.e., all changes on the local database made prior to the echo time are visible to the entire network).

If, in element 202, it is time to replicate, then in element 204, the data (including system tables, but not including the pulse and echo tables) is replicated between sites. If, in element 206, the replication was successful, then in element 208 a pulse is sent. The exact method used to send a pulse varies with the embodiment being implemented. The method used to replicate varies depending on the embodiment of the invention used. It should be noted that the exact method of replicating data between sites or copies of the database is not a main aspect of the described embodiments of the present invention. Any appropriate replication mechanism can be used.

In element 210, sites receiving replicated data send an echo to the site that originated the data. The exact method used to send an echo varies with the embodiment being implemented. Element 212 determines a site horizon for each site. The site horizon is established once the originating site has received echoes from all other sites. All sites have received data replicated from the originating site at or before the time the pulse was sent. A network horizon in element 214 is the earliest time that all updates for the network are received by all sites.

Figure 3A:
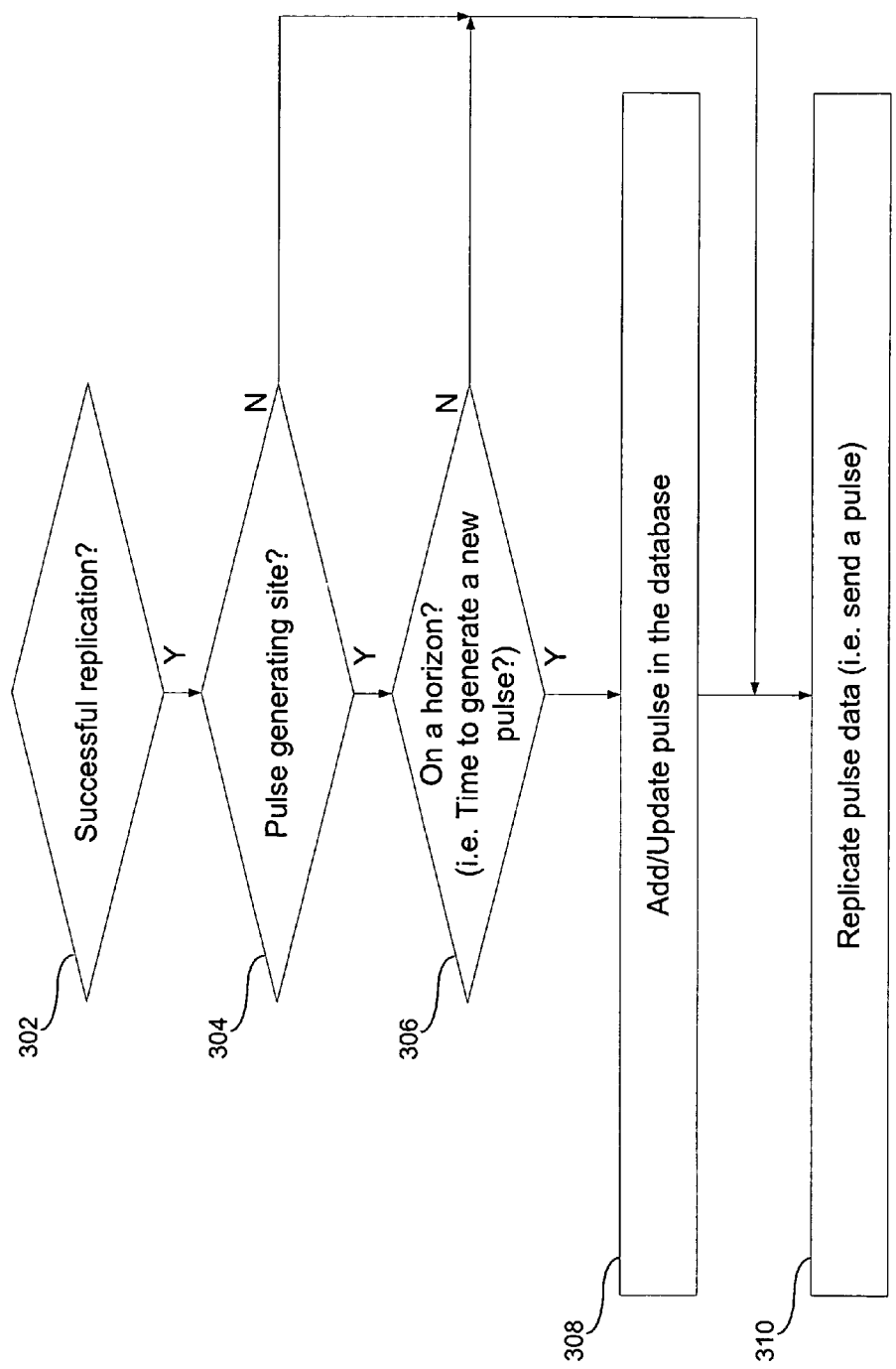
FIG. 3(a) is a flow chart of a method of sending a pulse from an originating site to receiving sites in accordance with a preferred embodiment of the present invention.
Figure 3B:
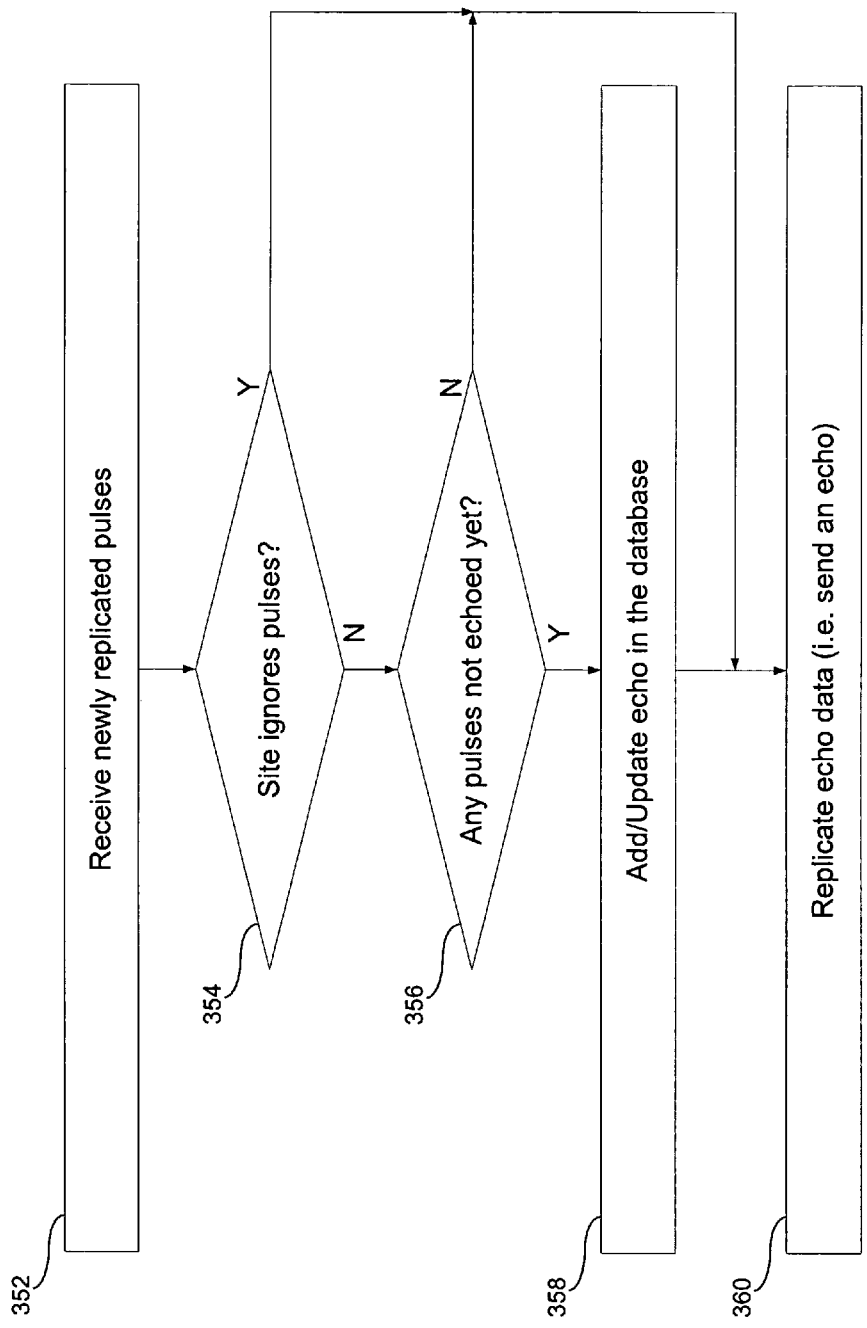
FIG. 3(b) is a flow chart of a method of sending an echo from a receiving site to an originating site in accordance with a preferred embodiment of the present invention.

FIGS. 3(a) and 3(b) show a method of sending a pulse and sending an echo, respectively, used in a preferred embodiment of the present invention. During replication, any site that has been designated as having horizon knowledge will update its record in the pulse table 400, recording the originating site's SiteID, a unique PulseID and the pulse time (all timestamps are in UTC/GMT). After the pulse table has been replicated, each site will check for new or updated pulse records and update the proper echo record into the echo table. An echo record will detail the originating SiteID and PulseID and the responding SiteID and echo time.

FIG. 3(a) is a flow chart of a method of sending a pulse from an originating site to receiving (target) sites in accordance with a preferred embodiment of the present invention. If, in element 302, it is time to replicate and in element 304, the site is designated as sending pulses, and in element 306 it is time to send a pulse, then in element 308, the site sending data to be replicated writes a pulse to the database that is then replicated (sent) in element 310. The exact method used to send a pulse varies with the embodiment being implemented. As shown in FIG. 4, in the described embodiment, a record in the pulse table 400 specifies a unique PulseID, the originating SiteID and replication time for a successful replication session. An example format of the echo table 500 is shown in FIG. 5.

FIG. 3(b) is a flow chart of a method of sending an echo from a receiving site to an originating site in accordance with a preferred embodiment of the present invention. The data that is received from an originating site in element 352 includes any new pulses created since the last replication cycle. In element 354, the site determines if it is to be part of the horizon. If not, then no echoes are written and the process jumps to element 360, just replicating back any other echoes that may exist from other sites in its database. In the described embodiment, the pulse table is replicated first. Then the echo table is replicated. An example format of the echo table 500 is shown in FIG. 5. In the described embodiment, an echo is sent by making an entry in the echo table for the originating, echoing SiteID pairing. An entry in the echo table indicates that a pulse table record has been seen by another site.

To prevent false echoes, the pulse table is replicated immediately before the echo table, and these tables are the last two replicated. This ensures that all user tables will have been replicated by the time either the pulse table or the echo table is replicated successfully.

In element 356, the receiving site looks at the pulse table to determine whether any new pulses have been added. If there are pulses that haven't been responded to, an echo will be written to the database in element 358 and replicated back to the originating site in element 360. In the described embodiment, an echo is sent by adding an entry to an echo table as shown in FIG. 5.

FIG. 4 is an example of a pulse table 400 in accordance with a preferred embodiment of the present invention. In a preferred embodiment, pulse table 400 contains at most one entry for each site generating pulses. Whenever an originating site sends data as part of the replication operation, the originating site will make an entry in pulse table 400 (or update it if one already exists) if the site has received all echoes back from its previous pulse. This entry corresponds to one pulse. Pulse table 400 includes three fields: an ID of an originating site 402, a unique PulseID 404 and a timestamp 406 at which the originating site sent a request to replicate. In a preferred embodiment, the pulse table is part of the data that is replicated along with the database.

One consideration for this algorithm is database size. If every one of n sites generates a pulse, which is echoed back by all n sites, then there will be $O(n^2)$ records in the pulse table. Management of these records then, is of prime importance. The database will use a management strategy to minimize the impact of these records.

The primary strategy to minimize pulse/echo records is filtering. Only sites that need to know a horizon value really need to generate pulses. By minimizing the number of sites generating pulses, the number of echoes in the system can be kept at a manageable level. At a minimum, only a single site needs to generate pulses.

This can be implemented using a parameter stored in the system tables of the replicated database. A default parameter would designate whether sites generate pulses or not, and if set to false only those sites specifically designated as pulse generators would be capable of determining site and network horizons.

FIG. 5 is an example of an echo table in accordance with a preferred embodiment of the present invention. In a preferred embodiment, echo table 500 contains multiple pairs of site Ids. The first part of each pairing is an originating ID 502 and unique PulseID 504. The second part of each pairing is an echoing site ID 506. The echo table 500 also includes a returning (echoing) timestamp 508. A pairing of an <originating site ID, echoing site ID> for a particular originating PulseID 504 and an echo timestamp 508 means that the echo site has echoed the originating pulse having ID 504 at time 508.

Figure 6:
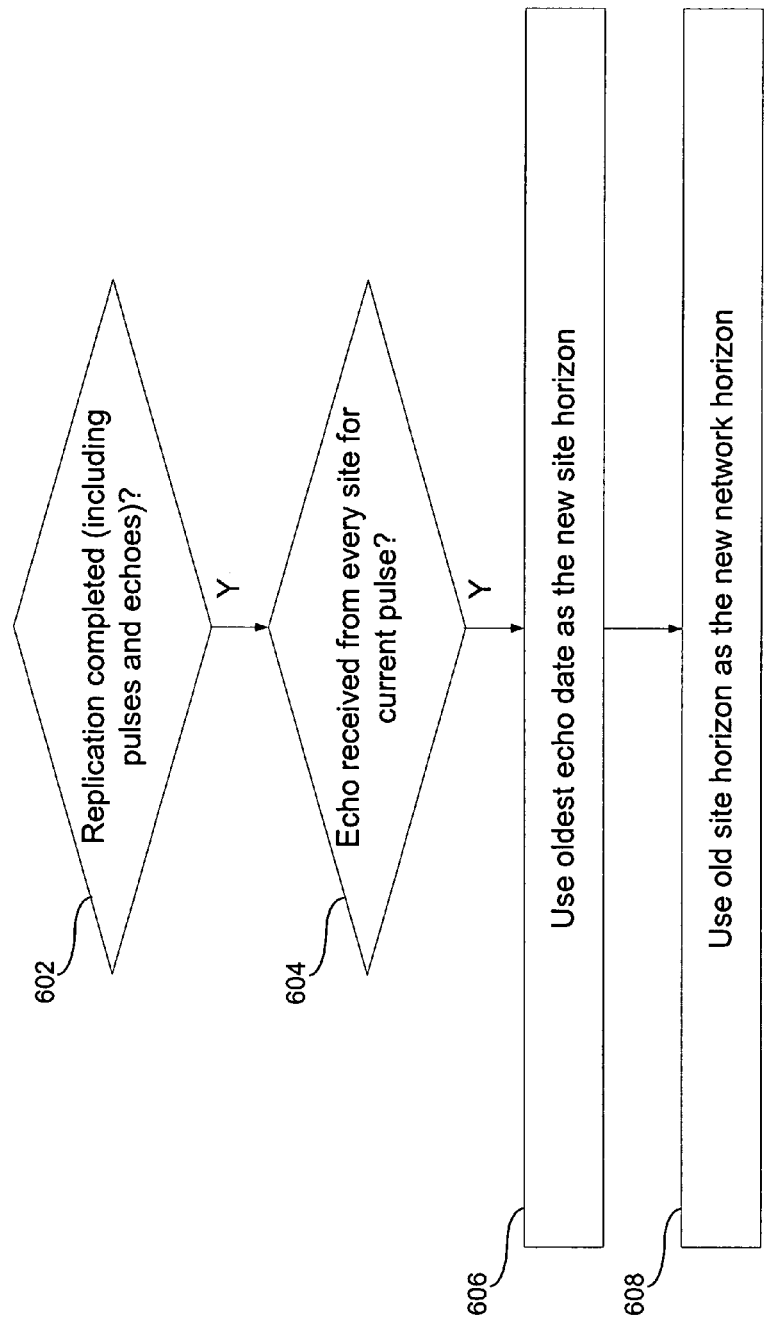
FIG. 6 is a flow chart showing a method of determining replication horizons in accordance with a preferred embodiment of the present invention.

FIG. 6 is a flow chart showing a method of determining a site horizon in accordance with a preferred embodiment of the present invention. To determine a site horizon, the method looks at the entries in the echo table 500. In element 602, if replication has failed for any reason, including errors replicating the pulse and echo tables, then no horizon exists. In element 604, if at least one site has not returned an echo for the current pulse, then no horizon exists. Otherwise, a horizon exists and element 606 shows a method of determining the horizon value. First, the method finds all the pairs of <originating site ID, echoing site ID> having the current pulseID, and finds the pairing with the earliest timestamp.

The network horizon (the horizon of the entire network, not just that of the originating pulse site) can be determined by keeping track of the previous site horizon value for the site. When a new site horizon is calculated, the previous site horizon can be used 608 as a network horizon. To generate a site horizon, a pulse is sent out and once all the echoes have returned, the site knows that all changes made at that site are now visible in the rest of the network. Because replication is bi-directional, we also know that all changes made at all other sites before the echo date are now visible at the pulse-generating site. If we go through this cycle one more time (i.e. create a new site horizon), then we can guarantee that all the data received during the creation of the previous site horizon has now been replicated out to all other sites. This means that the first (previous) site horizon can now be taken as the network horizon and used for any purpose requiring the knowledge that all sites have all data (for example: for cleanup of system tables). Both the site horizon and the network horizon will be written to the database in human-readable form.

Figure 7:
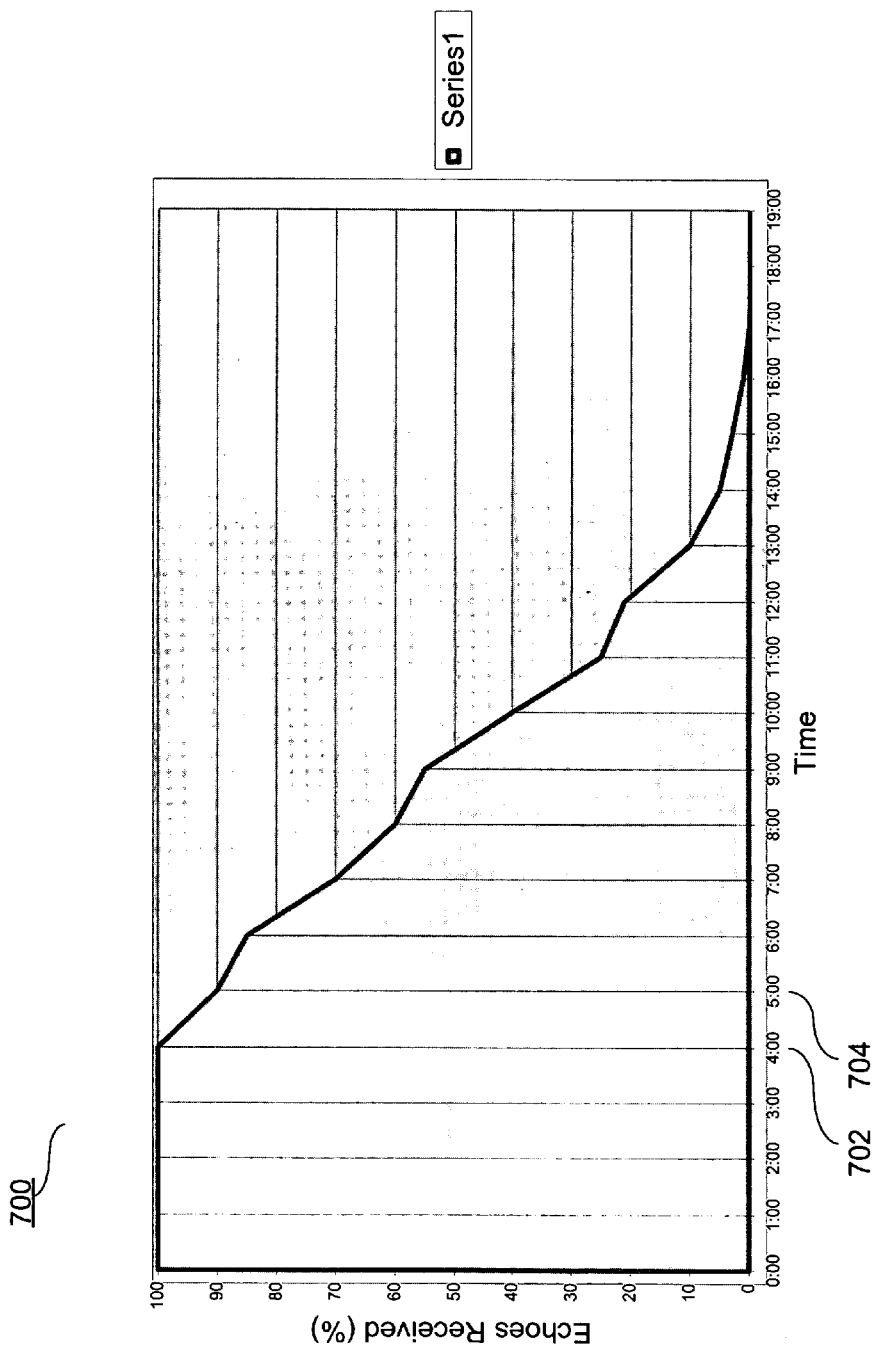
FIG. 7 is a user interface displayed on an appropriate display device to graphically show a specific site horizon.

FIG. 7 is a possible user interface 700 displayed on an appropriate display device to graphically show a horizon for a site. In this example, at the time 4:00 (element 702) 100% of sites have responded to the first pulse, which is therefore the current site horizon. Later times, such as time 5:00 (element 704) is not within the horizon because not 100% of the sites have echoed the next pulse. Other embodiments include control functionality for specifying cleanup or cleanup parameters and/or intervals or scheduling next cleanup manually. Alternate displays also show next cleanup times, etc.

In the diagram of FIG. 7, as time moves forward and new pulses are created, the graph scrolls from right to left. For each pulse time on the x-axis, the percentage of sites returning echoes should increase as time passes. When the percentage of sites that have returned an echo hits 100% for a given pulse, then that pulse represents the site horizon. Alternate embodiments indicate the site horizon on the graph.

Figure 8:
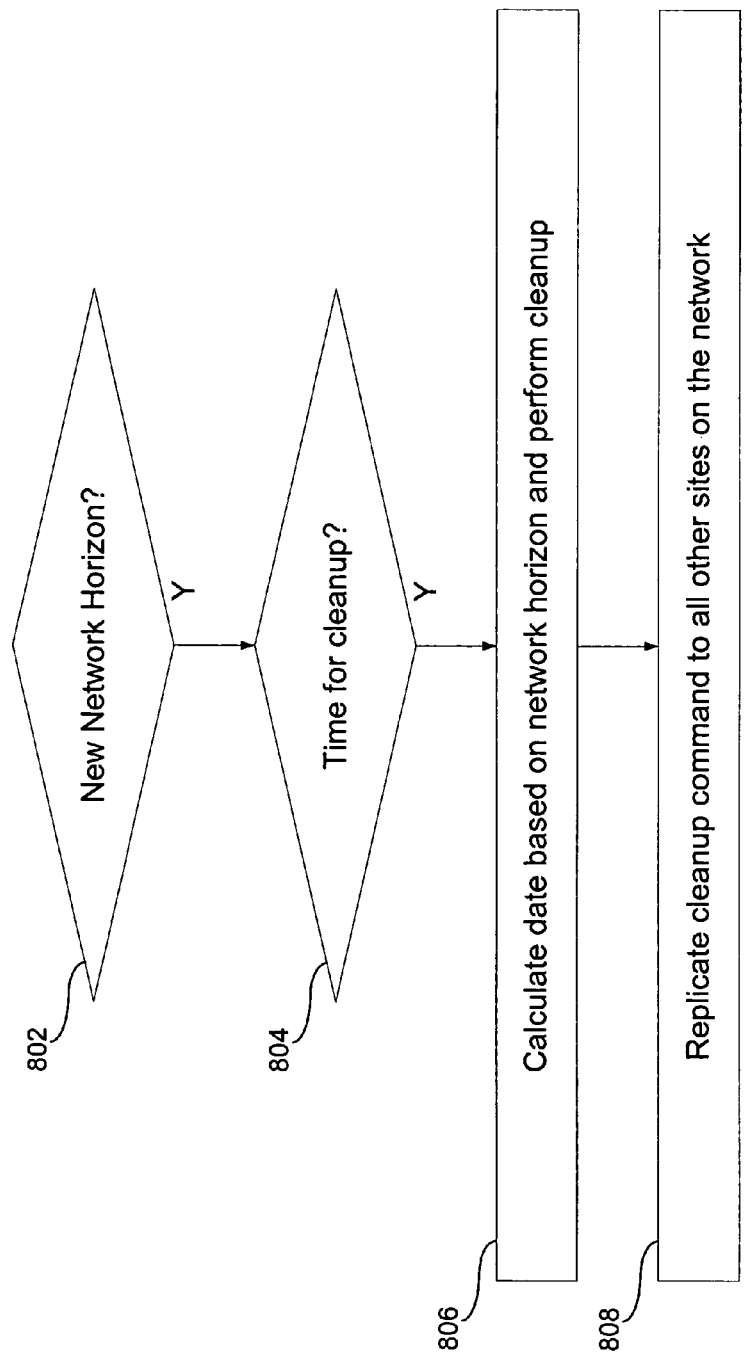
FIG. 8 is a flow chart showing a method using a network horizon to perform a cleanup method.

FIG. 8 is a flow chart showing a method using a network horizon to perform a system cleanup. Cleanup is the periodic removal of obsolete system and control records. In a preferred embodiment, cleanup is scheduled at a predetermined time to coincide with a network horizon calculation. Various embodiments use various methods of determining when it is time to perform cleanup. If, in element 802, a new network horizon has been created and in element 804 it is time for cleanup, a central cleanup site called a cleanup master issues a command that other sites should do cleanup operations for data that falls within the network horizon. Thus, in FIG. 7, cleanup operations could be performed for data replicated at 4:00 pm and earlier. It will be understood that the network horizon can be used in any situation where it is useful to determine whether a replication operation has completed for all sites.

Various types of cleanup operations are required in a replication network. For example, removal of executed commands and purging of marked-for-deleted control table records. When to do cleanup is an important issue. The cleanup time must be set frequently enough so that the database is not bloated by the extra data, but not too frequently, because some sites may not be able to replicate for fairly long periods. If the situation arises where one site has cleaned up records, while another has not, and these two sites replicate (with a wide replication window), then problems can ensue. For example, deleted records can be reintroduced, etc.

The solution to this problem is related to network horizon. Once the system ensures that the records that we want to purge have been seen by all sites, it becomes safe to purge them.

If data partitioning is implemented within a schema, other factors must be taken into consideration. In a hub and spoke scenario, data-partitioned tables will function in the same manner as global tables. However, if a true peer-to-peer network is implemented, then issues may arise based on potentially having more than one 'path' that data can take to reach a site. The following illustration can be used to describe this scenario where a false horizon is established.

Figure 9:
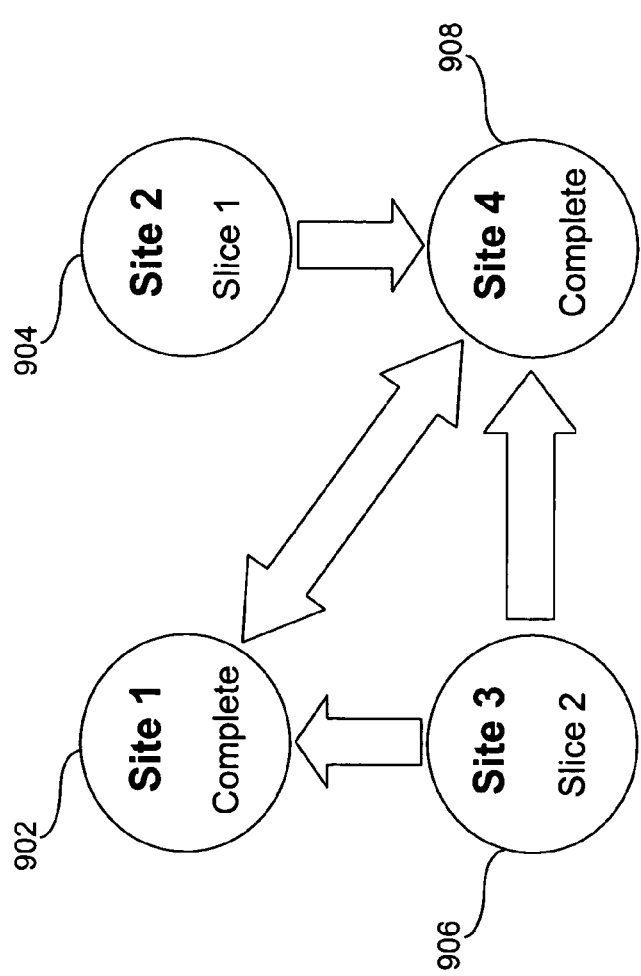
FIG. 9 shows an example of a configuration of sites using data slices.

Referring to FIG. 9, a user enters a slice 1 record at Site 1 at 10 am. This record is required by the data partitioning configured at Site 1, Site 2 and Site 4, but is not to be replicated to Site 3. At 10:15 am Site 3 replicates with Site 1 (and receives pulse s1p10:15) and Site 3 sends an echo (s3e10:15). Site 3 then replicates with Site 4 and the s1p10:15 pulse is received and echoed by Site 4. Site 2 then replicates with Site 4, receives and echoes the pulse, but has still not received the slice 1 data. Site 1 and Site 4 then replicate. At this point Site 1 has all three echoes from the other sites, creating a false horizon of 10:15 am since Site 3 still hasn't received the change to slice 2 that was made at 10 am. Since the change was made to slice 1 and Site 2 at that point hadn't replicated directly with Site 1, the change was never propagated. It would receive the change on its next replication with Site 4, however by then it might be too late, as a delete command could already be circulating to delete the corresponding control table record.

This false positive scenario can be avoided by making a few logic changes to how the pulses and echoes propagate. On replication, each site would determine if its partner site contains a superset or a subset of its data and this state information would be swapped in the initial handshake. Pulses would only be allowed to flow 'downhill' (superset to subset) or 'sideways' (identical subset to subset) and echoes would only flow 'uphill' (subset to superset) or 'sideways' (identical subset to subset). This would handle the above mentioned case, but has the side-effect of restricting pulse-generating sites to be complete sites only.

If a site is restored from a very old backup, it should be prevented from replicating. Allowing such a site to replicate could cause obsolete records (or even previously-deleted) records to be reintroduced into the replication network, potentially causing database integrity problems that are very difficult to recover from. If such a situation occurs, and is prevented, the site would have to be recovered from a more recent backup, or reinstalled.

One solution would be to restrict any old site from pushing in data that is older than the established horizon. A flag could be used to override this restriction; however any data older than the network horizon would be introduced as if it had been entered at the horizon date.

Appendix A, which is a part of this specification, and which is incorporated herein by reference, shows an example application program interface (API) for a preferred embodiment of the present invention.

The following paragraphs disclose additional embodiments.

Scalability

The number of records in the echo table grows as the square of the number of pulse generating sites. As long as we keep the number of such sites to a minimum, the number of echo table records is manageable. Unfortunately, if someone has a requirement that all sites know their site horizon, and they have a relatively large network, then the number of echo table records could grow into the millions. Since many of these records are updated at almost every replication, the time to replicate just the echo table records could ultimately overshadow the time required to replicate the user data. In general, most sites could use the network horizon without introducing this level of overhead.

Audit Records

Another potential method of solving this problem could be by the use of Audit records. If a record were inserted into the database at the end of each replication, then this data could theoretically be used to determine the horizon. This would probably require a fairly heavy computational load (and be difficult to implement), however perhaps this could be run after replication finishes on a low-weight thread.

While a preferred embodiment of the present invention has been described with reference to certain preferred embodiments, those skilled in the art will recognize that various modifications may be provided. Variations upon and modifications to preferred embodiments are provided for by the present invention, which is limited only by the following claims.

APPENDIX A

Horizon Functions
DSECGetAllEchoes
The DSECGetAllEchoes function is used to obtain information about the echoes returned to the specified pulse generator.
SYNTAX
ANSI
DSECGetAllEchoes(String* PDName, long PulseSiteID, int CurrentEchoesOnly, ArrayList* Echoes)
UNICODE
DSECGetAllEchoesW(String* PDName, long PulseSiteID, int CurrentEchoesOnly, ArrayList* Echoes)
INPUT PARAMETERS
PDName
   ODBC data source name associated with the database from where you want to obtain echo information from.
PulseSiteID
   Unique identifier for the site that sent the corresponding pulse. This site is referred to as a pulse generator. If this parameter is set equal to "0" all echoes for all pulse sites will be returned.
CurrentEchoesOnly
   Specifies whether current echoes or all echoes should be returned. This parameter can be set to either "1" or "0". If you set this parameter equal to "1", only current echoes for the specified pulse generator will be returned. If you set this parameter equal to "0", all echoes from all pulses received by a pulse generator will be returned.
OUTPUT PARAMETERS
Echoes
   Array of horizon information. This information is displayed in the following format:
   <PulseSiteID>=<PulseDate>~<EchoSiteID>=<EchoDate>, . . . .

where:
   PulseSiteID is the unique identifier for the pulse generator that sent the pulse.
   PulseDate is the date and time when the pulse was sent. This is in the form yyyy/mm/dd-hh:mm:ss.
   EchOSiteID is the unique identifier for the site that responded to the pulse with an echo.
   EchoDate is the date and time when the echo was returned. This is in the form yyyy/mm/dd-hh:mm:ss.
RETURNS
Zero (0) if successful; non-zero if unsuccessful.
DSECGetAllIgnorePulses
The DSECGetAllIgnorePulses function is used to determine the sites that ignore pulses and do not return an echo to the pulse generator.
SYNTAX
ANSI
DSECGetAllIgnorePulses(String*PDName, int IgnoreOnly, ArrayList* Ignores)
UNICODE
DSECGetAllIgnorePulsesW(String*PDName, int IgnoreOnly, ArrayList* Ignores)
INPUT PARAMETERS
PDName
   ODBC data source associated with the database from where you want to determine the sites that ignore pulses.
IgnoreOnly
   Specifies whether to list only those sites that ignore pulses for the specified data source. This parameter can be set to either "Y" or "N". If you set this parameter equal to "Y", only those sites that ignore pulses will be specified. If you set this parameter equal to "N", all sites regardless of whether they ignore pulses will be listed.
OUTPUT PARAMETERS
Ignores
   Specifies whether sites on the network ignore pulses. This parameter is displayed in the following format:
   <SiteID>=[Y|N], . . . .
   where:
      <SiteID> is the unique identifier for the site.
      [Y|N] Specifies whether the specified site ignores pulses. This parameter can be set to either "Y" or "N". If this parameter is set equal to "Y" then the site ignores pulses and is not used to determine the site horizon or network horizon for the specified data source. If this parameter is set equal to "N" then the site is considered when determining a site horizon or network horizon.
RETURNS
Zero (0) if successful; non-zero if unsuccessful.
DSECGetAllPulseGenerators
The DSECGetAllPulseGenerators function is used to determine the sites that are enabled to generate pulses for the specified data source.
SYNTAX
ANSI
DSECGetAllPulseGenerators(String*PDName, int GeneratorsOnly, ArrayList* Generators)
UNICODE
DSECGetAllPulseGeneratorsW(String*PDName, int GeneratorsOnly, ArrayList* Generators)
INPUT PARAMETERS
PDName
   ODBC data source associated with the database from where you want to determine the pulse generators on the Replication Network.

GeneratorsOnly
　Specifies whether to list only those sites that are pulse generators for the specified data source. This parameter can be set to either "Y" or "N". If you set this parameter equal to "Y", only those complete sites that are enabled to generate pulses will be specified. If you set this parameter equal to "N", all complete sites regardless of whether they are pulse generators will be listed.

OUTPUT PARAMETERS

Generators
　Specifies whether sites in the Replication Network are enabled to generate pulses. This parameter is specified in the following format:
　<SiteID>=[Y|N], . . . .
　where:
　　<SiteID> specifies the unique idenitifier for a complete site.
　　[Y|N] specifies whether the specified site is enabled to generate pulses. This parameter can be set to either "Y" or "N". If this parameter is set equal to "Y" then the site is able to generate a site horizon and a network horizon. If this parameter is set equal to "N" then the site is not able to generate a site horizon or network horizon.

RETURNS

Zero (0) if successful; non-zero if unsuccessful.

DSECGetAllPulses

The DSECGetAllPulses function is used to obtain the current pulses.

SYNTAX

ANSI

DSECGetAllPulses(String* PDName, ArrayList* Pulses)

UNICODE

DSECGetAllPulsesW(String* PDName, ArrayList* Pulses)

INPUT PARAMETERS

PDName
　ODBC data source name associated with the database from where you want to obtain all of the current pulses.

OUTPUT PARAMETERS

Pulses
　Information about the current pulses. This parameter is specified in the following format:
　<SiteID>=<PulseDate>, . . . .
　where:
　　<Site/D> is the unique identifier for a pulse generator.
　　<PulseDate> is the timestamp of the pulse. This is in the form yyyy/mm/dd-hh:mm:ss

RETURNS

Zero (0) if successful; non-zero if unsuccessful.

DSECGetAllSiteHorizons

The DSECGetAllSiteHorizons function is used to obtain all of the current site horizons.

SYNTAX

ANSI

DSECGetAllSiteHorizons(String* PDName, ArrayList* Horizons)

UNICODE

DSECGetAllSiteHorizonsW(String* PDName, ArrayList* Horizons)

INPUT PARAMETERS

PDName
　ODBC data source name associated with the database from where you want to obtain all of the current site horizons.

OUTPUT PARAMETERS

Horizons
　The current site horizons. This parameter is specified in the following format:
　<SiteID>=<HorizonDate>, . . . .
　where:
　　<SiteID is the unique identifier for the site.
　　<HorizonDate> is the date and time of the associated site horizon. This is in the form yyyy/mm/dd-hh:mm:ss.

RETURNS

Zero (0) if successful; non-zero if unsuccessful.

DSECGetCurrentEchoCount

The DSECGetCurrentEchoCount function is used to obtain the total number of echoes received by the pulse generator.

SYNTAX

ANSI

DSECGetCurrentEchoCount(String* PDName, long PulseSiteID, long_gc* EchoCount)

UNICODE

DSECGetCurrentEchoCountW(String* PDName, long PulseSiteID, long_gc* EchoCount)

INPUT PARAMETERS

PDName
　ODBC data source name associated with the database from where you want to obtain the current number of echoes.

PulseSiteID
　Unique identifier for the site that sent the corresponding pulse. This site is referred to as a pulse generator.

OUTPUT PARAMETERS

EchoCount
　Specifies the number of echoes that have been received by the specified pulse generator for the current pulse.

RETURNS

Zero (0) if successful; non-zero if unsuccessful.

DSECGetEcho

The DSECGetEcho function is used to obtain the timestamp for the current echo.

SYNTAX

ANSI

DSECGetEcho(String* PDName, long PulseSiteID, long EchoSiteID, DateTime& EchoDateTime)

UNICODE

DSECGetEchoW((String* PDName, long PulseSiteID, long EchoSiteID, DateTime& EchoDateTime)

INPUT PARAMETERS

PDName
　ODBC data source name associated with the database from where you want to obtain the timestamp associated with the current echo.

PulseSiteID
　Unique identifier for the site that generated the pulse whose corresponsding echo you want to obtain.

EchoSiteID
　Unique identifier for the site that generated the echo in response to a pulse sent by the specified pulse generator.

OUTPUT PARAMETERS

EchoDateTime
　Date and time of the current echo.
　If there is no echo associated with the pulse the EchoDateTime is set equal to "0".

RETURNS

Zero (0) if successful; non-zero if unsuccessful.

DSECGetHorizonEchoCount

The DSECGetHorizonEchoCount function is used to obtain the expected number of echoes to be received to generate a new horizon.

SYNTAX

ANSI

DSECGetHorizonEchoCount(String* PDName, long_gc* EchoCount)
UNICODE
DSECGetHorizonEchoCountW(String* PDName, long_gc* EchoCount)
INPUT PARAMETERS
PDName
    ODBC data source name associated with the database from where you want to obtain the current number of echoes that have been returned.
OUTPUT PARAMETERS
EchoCount
    Specifies the number of echoes that should be received to create a new horizon.
RETURNS
Zero (0) if successful; non-zero if unsuccessful.
DSECGetIgnorePulses
The DSECGetIgnorePulses function is used to determine whether the specified site ignores pulses sent by a pulse generator.
SYNTAX
ANSI
DSECGetIgnorePulses(String* PDName, long SiteID, int_gc* Ignore)
UNICODE
DSECGetIgnorePulsesW(String* PDName, long SiteID, int_gc* Ignore)
INPUT PARAMETERS
PDName
    ODBC data source name associated with the database from where you want to determine whether a site ignores pulses.
SiteID
    Unique identifier for the site that you want to determine whether it ignores pulses.
OUTPUT PARAMETERS
Ignore
    Specifies whether the specified site will ignore pulses sent by a pulse generator.
    This parameter can be set equal to either "1" or "0". If this parameter is set to "1," the specified site is not considered by the Replication Engine when determining a site or network horizon for the specified data source. If this parameter is set to "0", the specified site is considered by the Replication Engine when it determines a site or network horizon for the specified data source.
RETURNS
Zero (0) if successful; non-zero if unsuccessful.
DSECGetNetworkHorizon
The DSECGetNetworkHorizon function is used to obtain the current network horizon.
SYNTAX
ANSI
DSECGetNetworkHorizon(String* PDName, long_gc* PulseSite,
long_gc* PulseID, DateTime& HorizonDateTime)
UNICODE
DSECGetNetworkHorizonW(String* PDName, long_gc* PulseSite,
long_gc* PulseID, DateTime& HorizonDateTime)
INPUT PARAMETERS
PDName
  ODBC data source name associated with the database from where you want to obtain the network horizon.
OUTPUT PARAMETERS
PulseSite
    Unique identifier for the site that sent the corresponding pulse. This site is referred to as a pulse generator. If this parameter is set equal to "0" all echoes for all pulse sites will be returned.
PulseID
    Unique identifier for the pulse.
HorizonDateTime
    Date and time of the current network horizon.
    If a network horizon has not been generated, the HorizonDateTime is set equal to "0".
RETURNS
Zero (0) if successful; non-zero if unsuccessful.
DSECGetPreviousNetworkHorizon
The DSECGetPreviousNetworkHorizon function is used to obtain the previous network horizon.
SYNTAX
ANSI
DSECGetPreviousNetworkHorizon(String* PDName, long_gc* PulseSite, long* PulseID, DateTime& HorizonDateTime)
UNICODE
DSECGetPreviousNetworkHorizonW(String* PDName, long_gc* PulseSite, long_gc* PulseID, DateTime& HorizonDateTime)
INPUT PARAMETERS
PDName
    ODBC data source name associated with the database from where you want to obtain the previous network horizon.
OUTPUT PARAMETERS
PulseSite
    Unique identifier for the site that sent the corresponding pulse. This site is referred to as a pulse generator. If this parameter is set equal to "0" all echoes for all pulse sites will be returned.
PulseID
    Unique identifier for the pulse.
HorizonDateTime
    Date and time of the current network horizon.
    If a network horizon has not been generated, the HorizonDateTime is set equal to "0"
RETURNS
Zero (0) if successful; non-zero if unsuccessful.
DSECGetPulse
The DSECGetPulse function is used to obtain the timestamp for the current pulse.
SYNTAX
ANSI
DSECGetPulse(String* PDName, long SiteID, long_gc* PulseID, DateTime& PulseDateTime)
UNICODE
DSECGetPulseW(String* PDName, long SiteID, long_gc* PulseID, DateTime& PulseDateTime)
INPUT PARAMETERS
PDName
    ODBC data source name associated with the database from where you want to obtain the timestamp associated with the current pulse.
SiteID
    Unique identifier for the site whose current pulse you want to obtain.
OUTPUT PARAMETERS
PulseID
    Unique identifier for the pulse.

PulseDateTime
  Date and Time of the current pulse.
  If there are not any current pulses, the PulseDateTime parameter is set equal to "0".
RETURNS
Zero (0) if successful; non-zero if unsuccessful.
DSECGetPulseGenerator
The DSECGetPulseGenerator function is used to determine whether the specified site is able to generate pulses. These pulses are used to determine when the site's changes have been populated to all sites that are considered as part of the horizon.
SYNTAX
ANSI
DSECGetPulseGenerator(String* PDName, long SiteID, int_gc* Generator)
UNICODE
DSECGetPulseGeneratorW(String* PDName, long SiteID,
int_gc* Generator)
INPUT PARAMETERS
PDName
  ODBC data source name associated with the database that from where you want to determine whether a site is a pulse generator.
SiteID
  Unique identifier for the site that you want to determine whether it has the ability to generate pulses.
OUTPUT PARAMETERS
Generator
  Specifies whether the specified site and corresponding data source is enabled to generate pulses. This parameter can be set to either "1" or "0". If you set this parameter equal to "1" then the site will be able to generate a site horizon and a network horizon. If you set this parameter equal to "0" then the site will not be able to generate a site horizon or network horizon.
RETURNS
Zero (0) if successful; non-zero if unsuccessful.
DSECGetPulseGeneratorDefault
The DSECGetPulseGeneratorDefault function is used to obtain the default pulse generator setting for complete sites.
SYNTAX
ANSI
DSECGetPulseGeneratorDefault(String* PDName,
int_gc* GeneratorDefault)
UNICODE
DSECGetPulseGeneratorDefaultW(String* PDName,
int_gc* GeneratorDefault)
INPUT PARAMETERS
PDNAME
  ODBC data source associated with the database from where you want to determine the default pulse generator setting.
OUTPUT PARAMETERS
GeneratorDefault
  Specifies whether the default generator is all complete sites or specific complete sites. This parameter can be set to either "0" or "1". If this parameter is set equal to "1", the default generator setting is all complete sites. If this parameter is set equal to "0", each complete site site must be configured separately as a pulse generator.
  NOTE: The site allocated as the cleanup master is always configured as a pulse generator.
RETURNS
Zero (0) if successful; non-zero if unsuccessful.
DSECGetSiteHorizon
The DSECGetSiteHorizon function is used to obtain the current site horizon.
SYNTAX
ANSI
DSECGetSiteHorizon(String* PDName, long SiteID, long_gc* PulseID, DateTime& HorizonDateTime)
UNICODE
DSECGetSiteHorizonW(String* PDName, long SiteID, long_gc* PulseID, DateTime& HorizonDateTime)
INPUT PARAMETERS
PDName
  ODBC data source name associated with the database from where you want to obtain a site horizon.
SiteID
  Unique identifier for the site whose horizon you want to obtain.
OUTPUT PARAMETERS
PulseID
  Unique identifier for the pulse.
HorizonDateTime
  Date and time of the current site horizon.
  If there is not a current site horizon, the HorizonDateTime parameter is set equal to "0".
RETURNS
Zero (0) if successful; non-zero if unsuccessful.
DSECSetIgnorePulses
The DSECSetIgnorePulses function is used to specify whether the specified site will ignore pulses sent by a pulse generator.
SYNTAX
ANSI
DSECSetIgnorePulses(String* PDName, long SiteID, int Ignore)
UNICODE
DSECSetIgnorePulsesW(String* PDName, long SiteID, int Ignore)
INPUT PARAMETERS
PDName
  ODBC data source name associated with the database from where you want to specify whether a site will ignore pulses.
SiteID
  Unique identifier for the site that you want to specify whether it should ignore pulses.
Ignore
  Specifies, whether the specified site will ignore pulses sent by a pulse generator.
  You can set this parameter equal to either "1" or "0". If you set this parameter equal to "1," the specified site will not be considered by the Replication Engine when determining a site or network horizon for the specified data source. If you set this parameter equal to "0", the specified site will be considered by the Replication Engine when it determines a site or network horizon for the specified data source.
RETURNS
Zero (0) if successful; non-zero if unsuccessful.
RETURNS for DGetLastError( )
The DGetLastError function returns one of the following return codes on error conditions:
  DERR_INVALID_PARAMETER—You did not enter a valid value for one or more of the parameters.

DSECSetPulseGenerator

The DSECSetPulseGenerator function is used to specify whether a complete site generates pulses. These pulses are used to determine when the site's changes have been populated to all sites that are considered as part of the horizon.

NOTE: Only complete sites can be set as pulse generators.

SYNTAX

ANSI

DSECSetPulseGenerator(String* PDName, long SiteID, int Generator)

UNICODE

DSECSetPulseGeneratorW(String* PDName, long SiteID, int Generator)

INPUT PARAMETERS

PDName

ODBC data source name associated with the database from where you want to configure as a pulse generator.

SiteID

Unique identifier for the site that you specify whether you want to enable it to generate pulses.

Generator

Specifies whether the specified site should be enabled to generate pulses. This parameter can be set to either "1" or "0". If you set this paramater equal to "1" then the site will be able to generate a site horizon and a network horizon. If you set this parameter equal to "0" then the site will not be able to generate a site horizon or network horizon.

RETURNS

Zero (0) if successful; non-zero if unsuccessful.

RETURNS for DGetLastError( )

The DGetLastError function returns one of the following return codes on error conditions:

DERR_INVALID_PARAMETER—You did not enter a valid value for one or more of the parameters.

DSECSetPulseGeneratorDefault

The DSECSetPulseGeneratorDefault function is used to set the default pulse generator for complete sites.

SYNTAX

ANSI

DSECSetPulseGeneratorDefault(String* PDName, int GeneratorDefault)

UNICODE

DSECSetPulseGeneratorDefaultW(String* PDName, int GeneratorDefault)

INPUT PARAMETERS

PDNAME

ODBC data source associated with the database from where you want to set a default pulse generator.

GeneratorDefault

Specifies whether the default generator is all complete sites or specific complete sites. This parameter can be set to either "1" or "0". If you set this parameter equal to "1", the default generator will be all complete sites. If you set this parameter equal to "0", the default generator will be specific complete sites.

RETURNS

Zero (0) if successful; non-zero if unsuccessful.

What is claimed is:

1. A method for monitoring data replication in a database system having an originating site and a plurality of target sites, the method comprising:

sending a pulse from the originating site to one or more target sites of the plurality of target sites;

receiving, by the originating site, (1) one or more echoes created by the one or more target sites of the plurality of target sites responsive to the pulse from the originating site, the one or more echoes associated with the pulse for which it is responsive to, each of the one or more target sites creating one of the one or more echoes and (2) data included in the one or more echoes describing one or more echo creation times for the one or more echoes, each of the one or more echoes including data describing a current pulse identifier uniquely identifying the pulse for which the echo is responsive to; and determining a site horizon based at least in part on an echo table including one or more rows, each row including data describing:

a pulse identifier uniquely identifying an associated pulse;

a site combination including an originating site identifier and an echoing site identifier, the originating site identifier describing the site that originated a pulse identified by the pulse identifier, and the echoing site identifier describing the site that last sent an echo including data describing the pulse identifier; and an echo return timestamp describing the time when one of the one or more echoes was created, each echo return timestamp associated with a site combination and a pulse identifier, and wherein the site horizon is determined by (1) identifying one or more rows in the echo table as a matching set, the one or more rows storing the one or more site combinations associated with the current pulse identifier included in the received one or more echoes, each site combination having an associated echo return timestamp included in the matching set, and (2) selecting the earliest echo return timestamp from the matching set as the site horizon thereby indicating that all data changes made prior to the time indicated by the site horizon have been propagated in the database system.

2. The method of claim 1 wherein the pulse indicates that the originating site has replicated its data to one of the plurality of target sites.

3. The method of claim 1 wherein each echo created by one of the one or more target sites indicates that the one of the one or more target sites includes the data changes made at the originating site before the originating site generated the pulse.

4. The method of claim 1 wherein a first of the plurality of target sites receives the data changes made at the originating site from a second of the plurality of target sites.

5. The method of claim 1 wherein sending the pulse from the originating site includes transmitting the pulse to the one or more target sites that only include a subset of data in the originating site or that only include an identical set of data in the originating site.

6. The method of claim 1 further comprising:

determining whether an identified target site includes a superset of data in the originating site; and wherein sending the pulse from the originating site does not transmit the pulse to the identified target site if the identified target site includes the superset of data in the originating site.

7. The method of claim 1 wherein the one or more echoes are received from the one or more target sites that include one of subset of data in the originating site and an identical set of data in the originating site.

8. The method of claim 1 wherein one of the one or more echoes is created after its corresponding target site first receives the data changes made at the originating site and then receives a pulse record comprising information about the pulse.

9. The method of claim 8 wherein the one of the one or more echoes is created after receiving another echo transmitted by the originating site in response to receiving another pulse.

10. The method of claim 1 wherein one of the one or more echoes is created after its corresponding target site first receives the data changes made at the originating site and then receives 1) an echo record comprising information about another echo transmitted in response to receiving another pulse, 2) a pulse table comprising at most one pulse record for the originating site that has transmitted more than one pulse, or 3) the echo table.

11. The method of claim 1 further comprising determining, by the originating site, whether to generate the pulse based on a pre-configured permission allowing or preventing the originating site from generating the pulse.

12. An originating site in a database system comprising the originating site having a computer processor and a plurality of target sites, the originating site configured to:
send a pulse from the originating site to one or more target sites of the plurality of target sites;
receive (1) one or more echoes, created by the one or more target sites of the plurality of target sites responsive to the pulse from the originating site, the one or more echoes associated with the pulse for which it is responsive to, each of the one or more target sites creating one of the one or more echoes and (2) data included in the one or more echoes describing one or more echo creation times for the one or more echoes, each of the one or more echoes including data describing a current pulse identifier uniquely identifying the pulse for which the echo is responsive to; and
determine a site horizon based at least in part on an echo table including one or more rows, each row including data describing:
a pulse identifier uniquely identifying an associated pulse;
a site combination including an originating site identifier and an echoing site identifier,
the originating site identifier describing the site that originated a pulse identified by the pulse identifier, and
the echoing site identifier describing the site that last sent an echo including data describing the pulse identifier; and
an echo return timestamp describing the time when one of the one or more echoes was created, each echo return timestamp associated with a site combination and a pulse identifier, and wherein the site horizon is determined by (1) identifying one or more rows in the echo table as a matching set, the one or more rows storing the one or more site combinations associated with the current pulse identifier included in the received one or more echoes, each site combination having an associated echo return timestamp included in the matching set, and (2) selecting the earliest echo return timestamp from the matching set as the site horizon thereby indicating that all data changes made prior to the time indicated by the site horizon have been propagated in the database system.

13. The originating site of claim 12 wherein the pulse indicates that the originating site has replicated its data to one of the plurality of target sites.

14. The originating site of claim 12 wherein each echo created by one of the one or more target sites indicates that the one of the one or more target sites includes the data changes made at the originating site before the originating site generated the pulse.

15. The originating site of claim 12 wherein a first of the plurality of target sites receives the data changes made at the originating site from a second of the plurality of target sites.

16. The originating site of claim 12 wherein the originating site is configured to transmit the pulse to the one or more target sites that only include a subset of data in the originating site or that only include an identical set of data in the originating site.

17. The originating site of claim 12 wherein the originating site is configured to determine whether an identified target site includes a superset of data in the originating site, and the originating site does not transmit the pulse to the identified target site if the identified target site includes the superset of data in the originating site.

18. The originating site of claim 12 wherein the originating site is configured to receive the one or more echoes from the one or more target sites that include a subset of data in the originating site or that include an identical set of data in the originating site.

19. The originating site of claim 12 wherein one of the one or more echoes is created after its corresponding target site first receives the data changes made at the originating site and then receives 1) a first pulse record comprising information about the pulse, 2) an echo record comprising information about another echo transmitted by the originating site in response to receiving another pulse, 3) a second pulse record comprising information about the pulse and the another echo transmitted by the originating site in response to receiving the another pulse, 4) a pulse table comprising at most one pulse record for the originating site that has transmitted more than one pulse, or 5) the echo table.

20. The originating site of claim 12 wherein each echo is created by one of the one or more target sites after the one of the one or more target sites first receives the data changes made at the originating site and then receives the pulse.

21. The originating site of claim 12 wherein the originating site is further configured to determine whether to generate the pulse based on a pre-configured permission allowing or preventing the originating site from generating the pulse.

* * * * *